UNITED STATES PATENT OFFICE 2,245,514

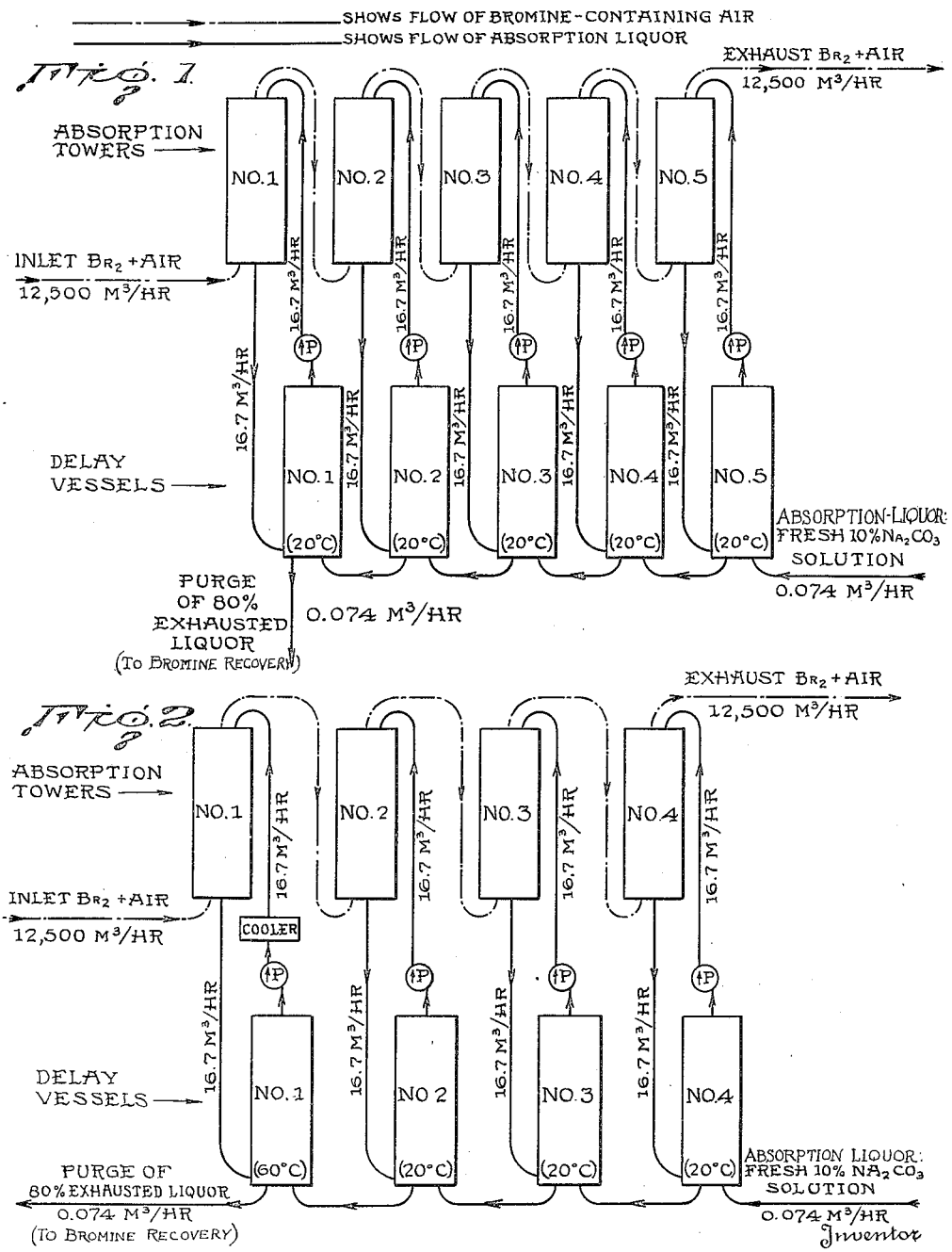

ABSORPTION OF BROMINE

Arthur Tandy Williamson, Northwich, England, assignor to Imperial Chemical Industries Limited, a corporation of Great Britain Application February 24, 1940, Serial No. 320,655
In Great Britain February 18, 1939

4 Claims. (Cl. 23—85)

This invention relates to the recovery of bromine from mixtures of bromine vapour and gases, such as the mixture of bromine vapour and air obtained by passing a current of air or other suitable gas through chlorinated sea-water or salt brine.

A known method of recovering bromine from sea water and other salt brines comprises the chlorination of the brine (which is preferably first acidified to pH 3–4), the removal of the free bromine thereby liberated by treatment with a current of air, and the absorption of bromine from the bromine-bearing air by means of alkaline absorbing liquors.

Absorption is normally effected by treatment of the bromine-containing gas with an aqueous solution or suspension of an alkaline-reacting material. Because of economic considerations, the absorbing medium which is generally employed is a solution of sodium carbonate, which absorbs bromine with the formation of sodium bromide and sodium bromate. The solution is then worked up for the recovery of these salts as for the production of bromine.

In the absorption stage, the problem is one of removing, as completely as possible, the bromine from the air or other gas with which the chlorinated brine has been blown. The amount of bromine present, relative to the carrier gas, is usually very small, e. g. the partial pressure of the bromine in the gas may be 0.1 to 0.2 mm. Hg.

An object of the present invention is to provide a process for the absorption of bromine from bromine-bearing gases which is of improved efficiency as compared with known processes. A further object is to provide an improved process for the absorption of bromine from bromine-bearing gases by means of an alkaline reacting absorption liquor which is brought repeatedly into contact with the gases. A further object is to provide a process for the absorption of bromine from bromine-bearing gases by treatment with an alkaline reacting absorption liquor in a series of absorption towers or the like, in which, for the same total rate of bromine absorption, a smaller number of towers can be used than in previously known processes, or in which, for the same number of towers, an increased rate of bromine absorption is attained. A further object is to provide an efficient process for the absorption of bromine from gases in which bromine is present in very low concentration. These objects are accomplished by the invention as hereinafter described.

I have found that the adsorptive efficiency of the alkaline absorbing medium (i. e. the amount of bromine that a unit volume of liquid will remove in unit time from a given gas under given absorption conditions) decreases more rapidly from its initial value than can be accounted for by the decrease in alkalinity consequent on absorption. Thus the liquor leaving an absorption tower, which should, on the basis of its residual alkalinity, still have a considerable absorption value, may in practice have a very low absorption value.

The invention is based on the discovery that if the absorbing medium leaving an adsorption tower be allowed to stand for some time, or if it is heated, it recovers at least a substantial proportion of the absorption efficiency corresponding to its residual alkali content. I have observed that an alkaline absorbing medium loses its power to absorb bromine essentially in two ways:—

(1) Due to the expenditure of alkali by reaction with the bromine, and (2) Due to another and hitherto unappreciated factor, the nature of which will be discussed later on. The first factor can, of course, be allowed for in various ways; for example: a proportion of the spent bromine-charged medium may be purged away for bromine recovery purposes and replaced by fresh medium of appropriate concentration. The second factor can be compensated for by increasing the periodic time of circulation of the absorbing medium without altering the liquor circulation rate, which implies providing larger quantities of absorption liquor than are normally used. The second factor can also be compensated for by heating the liquor while it is outside the tower.

To assist the understanding of the invention, a brief discussion of the absorption mechanism will be given. Assuming that a solution of sodium carbonate be used as the absorbing medium, the complete reaction, whereby bromine is taken up with the formation of sodium bromide and sodium bromate, is usually expressed by the equation:

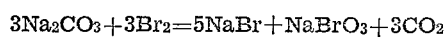

$$3Na_2CO_3 + 3Br_2 = 5NaBr + NaBrO_3 + 3CO_2$$

Actually, the adsorption process is a complex one. In the beginning, the following equilibrium is rapidly established:

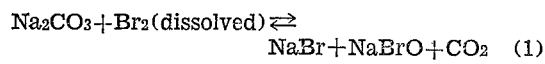

$$Na_2CO_3 + Br_2(\text{dissolved}) \rightleftharpoons NaBr + NaBrO + CO_2 \quad (1)$$

In the course of time, a slow reaction occurs, represented by:

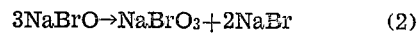

$$3NaBrO \rightarrow NaBrO_3 + 2NaBr \quad (2)$$

so that, if sufficient time is allowed to permit Reaction 2 to go to completion, the final result is the sum of Reactions 1 and 2, i. e.

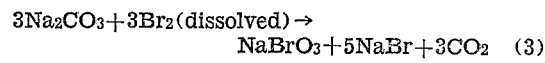

$$3Na_2CO_3 + 3Br_2(\text{dissolved}) \rightarrow NaBrO_3 + 5NaBr + 3CO_2 \quad (3)$$

Thus bromine passes from the gaseous to a labile state and thence to a fixed state. Labile bromine concentration L is defined as the concentration of bromine in all states represented in Reaction 1, whereas fixed bromine concentration is defined as the concentration of bromine in all states represented in Reaction 3.

I have found that the equilibrium in Reaction 1 involves a bromine concentration in the liquor which is very much greater than is involved in Reaction 3. These bromine concentrations depend in both cases on the pH of the liquor concerned, and on the degree of exhaustion of the alkaline liquor, but when these conditions are fixed, the equilibrium concentration of bromine in Reaction 1 is usually some thousands of times greater than in Reaction 3 and the back pressure of bromine (opposing absorption of bromine from the gas) is correspondingly greater. Now, the concentration of bromine in the gas mixture resulting from the air blowing of chlorinated brines is very low; it is usually a few hundredths or tenths of a mm. Hg. I have found that, after the absorption of relatively little bromine and before exhaustion of the carbonate is complete there may be a back pressure of bromine exerted by the absorption liquor commensurate with the partial pressure of bromine in the gas to be stripped thereof. The difference between the two pressures may be termed the driving pressure. The greater the driving pressure, the more efficient is the absorption by a given liquor. This means that the same absorption duty may be carried out with less apparatus by increasing the driving pressure. When, due to a certain amount of absorption having taken place, the two pressures become almost equal, the driving pressure approaches zero, and absorption almost ceases.

The driving pressure, however, may be increased by reducing the back pressure, by either or both of the above described methods, i. e. by providing larger volumes of absorption liquor than are normally used or by heating the liquor while it is outside the tower.

The whole absorption process may roughly be divided into two stages, the absorption stage proper (converting bromine from the gaseous to the labile dissolved state) and the digestion stage (converting bromine from the labile to the fixed state). In any given alkaline solution absorbing bromine a steady state will be reached in which the concentration of labile bromine will neither increase nor decrease, i. e. in which the velocity of the absorption process proper $Va$ will equal that of the digestion process $Vd$. I have found that the digestion process is roughly bimolecular, that is, the amount of labile bromine digested in unit time per unit volume of liquor is equal to $K(L)^2$ where $K$ is a velocity constant and $(L)$ is the concentration of labile bromine, i. e. the concentration of bromine in all states represented in Equation 1. Thus the total amount digested per unit time is equal to $Vd \simeq KV(L)^2$ where $V$ = total volume of absorption liquor. Hence, in the steady state $$Va = Vd \simeq KV(L)^2$$

or $(L) \simeq \dfrac{i}{\sqrt{V}}$

The back pressure of bromine is proportional to the concentration $(L)$ of labile bromine. Hence the back pressure of bromine is roughly proportional to the reciprocal of the square root of the total volume of liquor. Thus the back pressure of bromine may be reduced and accordingly the same absorption duty carried out with smaller absorption apparatus, by increasing the total volume of absorption liquor.

This aspect of the invention is equivalent to that involving the time factor, since in a cyclically operated absorption tower the volume of liquor associated with the tower is equal to the product of the periodic time of circulation and the circulation rate.

According to the present invention, therefore, bromine is absorbed from gases containing it by treating the bromine-bearing gas with an alkaline reacting absorption liquor in a plurality of cyclically operated absorption towers arranged in series, the flows of gas and liquor in the series as a whole being countercurrent and in the towers co-current or countercurrent, and reducing the back pressure of bromine exerted by the circulating liquor by employing in association with at least one tower such a volume of circulating liquor that the periodic time of circulation for that tower exceeds a minimum time $t_0$ given by the expression $$t_0 = \frac{5W}{Q_L}$$

minutes (where $W$ is the total rate of absorption of bromine in the whole series of towers, in Kg. per minute, and $Q_L$ is the rate of liquor circulation in the said tower, in cubic metres per minute) and/or by heating at least a part of the circulating liquor associated with at least one tower, while the liquor is outside the tower, to a temperature substantially higher than that at which absorption of bromine is effected in the tower, the heated liquor being cooled before it is again brought into contact with the gas.

The absorption may be carried out in any suitable type of apparatus for bringing gases and liquids into contact, and the term "tower" as used herein includes any such apparatus. The tower may be packed with inert packing material irrigated with the absorption liquor, or the liquor may be sprayed into the tower at one or more points, or the gas may be bubbled through the liquor in a bubbling type of tower. The liquor leaving the tower is collected in a reservoir from which the liquor is constantly fed to the same tower. It is important that the liquor should flow continuously through the reservoir, that is, that no portion of the liquor should be stagnant.

By a cyclically operated absorption tower is meant a tower through which absorption liquor is passed in a cycle, the liquor withdrawn from the tower being returned thereto, except for a small portion of the liquor which may be passed forward as make-up to the next tower of the series.

The periodic time of circulation for any tower is obtained by dividing the total volume of liquor associated with the tower (i. e. the liquor in the tower and in the circuit connected therewith, such as pumps, pipelines and reservoirs etc.) by the rate of liquor circulation through the tower and its circuit. Thus the condition that for any tower the periodic time of circulation shall exceed the value $$\frac{5W}{Q_L}$$

is satisfied by employing a volume of liquor associated with that tower greater than $5W$ cubic metres.

In what I regard as the best mode of carrying out the invention each tower has associated with it a volume of circulating liquor such that the periodic time of circulation for each tower exceeds the said minimum time. It is also advantageous that at least one tower should have associated with it a volume of circulating liquor greater than the average volume per tower, this tower being situated at or near the end of the series where the gas enters.

The greater the periodic time of circulation (for a given rate of liquor circulation) the greater is the rate of digestion of labile bromine. Accordingly it is possible to employ such periodic times that a substantial reduction in the number of absorption towers may be effected. For example while a periodic time of circulation of $$\frac{5W}{Q_L}$$

minutes in each tower enables the same degree of absorption to be effected in eight towers as is effected in nine towers in the known process, an increase of the periodic time to $$\frac{10W}{Q_L}$$

minutes in each tower enables the same degree of absorption to be effected in seven towers; an increase to $$\frac{20W}{Q_L}$$

minutes in each tower enables the same degree of absorption to be effected in six towers; an increase to $$\frac{50W}{Q_L}$$

minutes in each tower enables the same degree of absorption to be effected in five towers; an increase to $$\frac{100W}{Q_L}$$

minutes in each tower enables the same degree of absorption to be effected in four towers. It may be added that it would require three towers to attain the same degree of absorption if the periodic time in each tower were infinitely large. In these comparisons it is assumed that in all cases towers operating counter-currentwise at 70 per cent efficiency are employed, the efficiency being reckoned on the ratio of the difference between the bromine partial pressures of the gases entering and leaving the tower and the difference of the bromine partial pressure of the gas entering the tower and of the liquor entering the tower.

In one good way of carrying out the invention I may proceed by the following steps:

(a) Passage of the alkaline absorption liquor through the absorption tower or equivalent apparatus; (b) passage of the liquor from the absorption tower through a reservoir which is sufficiently large for the digestion process to proceed at a low labile bromine concentration; (c) re-use of the liquor for the absorption of further quantities of bromine.

In practice, and especially to facilitate continuous operation, the aforesaid stage (b) is conveniently operated by providing a reservoir sufficiently large that the alkaline liquor which it contains is exhausted relatively slowly. This reservoir or delay vessel forms part of a circulating system, the path of the liquor being from the tower to the delay vessel and back again. Balancing adjustments by way of addition of make-up alkaline liquor and of compensation for such quantities as may be withdrawn for working up for bromine or other constituents will be apparent to those skilled in the art.

If desired, the liquor in the delay vessel may be heated. Since the second reaction mentioned above, i. e. the digestion of labile bromine, has a considerable temperature coefficient and the labile bromine concentration in the liquor decreases more rapidly in the hot, the heating of the liquor enables a smaller delay vessel to be used for a given state of absorption conditions. Advantageously, the stream of heated liquor returned from the delay vessel to the tower is cooled prior to its re-use for absorption (which is normally carried out at or near the atmospheric temperature in order to reduce the volatility of the bromine).

For each 10° C. rise in the temperature of the liquor in the delay vessel, the velocity constant of the digestion reaction is approximately doubled. Hence, for a given set of working conditions, the size of the delay vessel may be substantially reduced when the delay vessel is at an elevated temperature.

If desired, a part only of the liquor leaving the tower may be circulated through the delay vessel, the remainder of the liquor being returned to the absorption system, i. e. to the same or different tower. This method of working may suitably be employed when the delay vessel is maintained at an elevated temperature.

The invention is applicable to the winning of bromine from any bromine-containing gas mixture for which alkaline absorption is necessary but is specially applicable to such gas mixtures in which the partial pressure of bromine is 1 mm. Hg. or less, e. g. bromine-containing air obtained by the air-blowing of chlorinated sea water or other salt brine.

For economic reasons the alkaline absorbing medium which will normally be employed is an aqueous solution of sodium carbonate. The concentration of the solution will generally be below about 15 per cent. by weight since at greater concentrations, crystallisation of salts may occur which would adversely affect the operation of the process. The concentrations normally employed are from about 3 per cent to about 12 per cent by weight of $Na_2CO_3$. Other alkaline absorbing media which may be employed include caustic soda solutions and borax solutions, but in the case of the absorption of bromine from bromine-bearing air obtained by the air-blowing of oxidised (e. g. chlorinated) brines, the presence of carbon dioxide in the air (from the air or from the acidified brine or both) will affect the alkaline solution and eventually set up an equilibrium between carbonate and bicarbonate.

In the accompanying drawing I have shown diagrammatic flow sheets illustrative of two good modes of carrying out the process of the invention. In the drawing, Fig. 1 is a flow sheet corresponding to Example 4 and Fig. 2 is a flow sheet corresponding to Example 5.

The figures will be described in connection with specific Examples 4 and 5, below.

The invention is illustrated, but not limited, by the following examples. Example 1 is illustrative of typical prior art processes. Examples 2 to 5 are illustrative of processes according to the invention, in which equal volumes of circulating liquor are employed in the several towers and Examples 6 to 9 illustrate embodiments in which a different volume is employed for each tower.

In each of these examples counter-current absorption of bromine from bromine-containing air is effected in a series of absorption towers, each of similar design and in each of which counter-current absorption takes place. Each tower is provided with a supply of absorption liquor, which is circulated through the tower, delay vessel and appendant pumps, pipe lines, etc. Simultaneously the bromine-charged absorption liquor which is more or less exhausted is purged away from the first delay vessel, and make-up absorption liquor is brought forward from the second delay vessel. The loss of absorption liquor from the second delay vessel is balanced by absorption liquor brought forward from the third delay vessel, and so on. The loss of liquor from the last delay vessel is made up by the introduction of fresh absorption liquor. The whole process may be continuous or discontinuous but, for simplicity, the continuous process is described in these examples. In the case of a continuous process the amount of absorption liquor removed by the purge is exactly balanced by the introduction of fresh liquor.

The bromine-air mixture passes through the first absorption tower and the partially-stripped gas is led into the second tower. The exit gas of the second tower is led into the third tower and so on. The exit gas of the last tower escapes to the atmosphere. It will be appreciated that the maximum permissible bromine content of the latter exit gas will depend on various factors such as economic considerations and the location of the plant.

Certain variable quantities must be defined before a precise picture of the conditions which obtain in each tower at the steady state, is possible. In any tower, let $P_1$ = partial pressure of bromine in the inlet gas, in microatmospheres
$P_2$ = partial pressure of bromine in the exit gas, in microatmospheres
$P_3$ = partial pressure of bromine exerted by the liquor entering the tower, in microatmospheres
$P_4$ = partial pressure of bromine exerted by the liquor leaving the tower, in microatmospheres.

Then the "tower efficiency" $E$, expressed as a percentage, is defined by the relation $$E = \frac{P_1 - P_2}{P_1 - P_3} \times 100$$

A quantity $r$, which is the material transfer analogue of the "water-equivalent ratio" of heat transfer problems is defined by the relation $$r = \frac{P_4 - P_3}{P_1 - P_2}$$

Those skilled in the art of absorption tower design will appreciate that the tower efficiency $E$ is a function of the ratio $r$. However, when $r$ is small, e. g. 0.1 or less, $E$ approaches very closely a limiting value. As a matter of fact these conditions pertain in the system under consideration and $E$ is, therefore, given a constant value for each of the towers. This value depends, of course, on the size and the absorption coefficient of the tower.

The following working conditions are common to all the examples.

| | |
|---|---|
| Temperature of working | 20° C. |
| (It should be noted that in Example 5, some of the liquor is heated to above this temperature.) | |
| Efficiency E of each tower | 70%. |
| Partial pressure $P_1$ of bromine in the bromine-air mixture entering the first tower. | 120 microatmospheres. |
| Rate of entry of bromine into the first tower. | 10 kilograms per hour or 0.167 kilograms per minute. |
| Degree of exhaustion of purged absorption liquor. | 80%. |
| Composition of fresh make-up absorption liquor. | 10% (by weight) $Na_2CO_3$ aqueous solution. |
| Rate of circulation of the liquor through each tower. | 16.7 cubic metres per hour. 0.278 cubic metres per minute. |

Maximum amount of bromine allowed to escape into the atmosphere is 3 per cent of bromine entering the first tower. This means that the total bromine absorption rate must not be less than 9.7 kilograms per hour or 0.162 kilogram per minute. In other words, the partial pressure of bromine in the exit gas of the last tower must not exceed about 4 microatmospheres.

Each tower is 7 feet long by 3 feet wide and is filled to a depth of 6¼ feet with stacked 3 inch by 3 inch by ¼ inch stoneware rings.

*Example 1*

This example represents typical conditions pertaining in an absorption plant operating in the known manner. The volume of liquor associated with each tower is 0.556 cubic metres which implies, since the liquor circulation rate is 0.278 cubic metre per minute, a periodic time of circulation in each tower of 2 minutes. It is found that nine towers are necessary to absorb at least 97 per cent of the bromine in the inlet air. The actual total rate of absorption is 9.82 kilograms per hour (W=0.164 kilogram per minute). In this case the periodic time of circulation $t$ is only $$3.4 \frac{W}{Q_L}$$

The total liquor volume associated with the whole series is 5 cubic metres.

*Example 2*

In this example the volume of liquor associated with each tower is increased to 1.43 cubic metres and it is found that only seven towers are necessary to absorb at least 97 per cent of the bromine in the initial air. The total rate of absorption is 9.83 kilograms per hour (W=0.164 kg./minute). The periodic time of circulation is 5.15 minutes, i. e. equal to $$8.7 \frac{W}{Q_L}$$

The total liquor volume is 10 cubic metres.

*Example 3*

Each tower having 3.33 cubic metres of absorption liquor associated therewith it is found that six towers only are required to absorb 9.84 kilograms per hour of bromine (i. e. W=0.164 kg./minute). The periodic time of circulation is 12 minutes, i. e.

$$20.3 \frac{W}{Q_L}$$

The total liquor volume is 20 cubic metres.

Example 4

Each tower having 8 cubic metres of absorption liquor associated therewith, it is found that five towers only are required to absorb 9.81 kilograms per hour of bromine (i. e. W=0.164 kg./minute). The periodic time of circulation is 28.8 minutes, i. e.

$$48.8 \frac{W}{Q_L}$$

The total liquor volume is 40 cubic metres. The operation of this example is illustrated in the flow sheet of Figure 1.

Increase of the volume of absorption liquor associated with each tower to 20 cubic metres, i. e., increase of the periodic time to $$122 \frac{W}{Q_L}$$

permits the use of only four towers.

Example 5

In this example each tower has 10 cubic metres of absorption liquor associated therewith, but the liquor leaving tower No. 1 is heated to 60° C. in the delay vessel associated with that tower, and then cooled to 20° C. before its return to the tower. The other towers and delay vessels are maintained at 20° C.

With this arrangement it is found that four towers absorb 9.75 kilograms of bromine per hour (i. e. W=0.163 kg./minute). The periodic time of circulation is 36 minutes, i. e.

$$61.4 \frac{W}{Q_L}$$

The total liquor volume is 40 cubic metres as in Example 4. The operation of this example is illustrated in the flow sheet of Figure 2.

Example 6

In this example and in the subsequent examples the absorption liquor is unevenly distributed among the towers in the sense that the early towers, i. e. those nearer the inlet gas end of the series, have a larger share of the liquor. The following table shows this distribution and gives the periodic time of circulation for each tower.

| Tower No. | Liquor volume, cubic metres | Periodic time, minutes | Periodic time as a function of $\frac{W}{Q_L}$ |
|---|---|---|---|
| 1 | 2.0 | 7.2 | $12.3 \frac{W}{Q_L}$ |
| 2 | 1.0 | 3.6 | $6.15 \frac{W}{Q_L}$ |
| 3 | 0.5 | 1.8 | $3.08 \frac{W}{Q_L}$ |
| 4 | 0.3 | 1.08 | $1.84 \frac{W}{Q_L}$ |
| 5 | 0.3 | 1.08 | $1.84 \frac{W}{Q_L}$ |
| 6 | 0.3 | 1.08 | $1.84 \frac{W}{Q_L}$ |
| 7 | 0.3 | 1.08 | $1.84 \frac{W}{Q_L}$ |
| 8 | 0.3 | 1.08 | $1.84 \frac{W}{Q_L}$ |

It is found that eight towers only are required to absorb 0.77 kilogram per hour of bromine (i. e. W=0.163 kg./minute).

The total liquor volume is 5 cubic metres.

Example 7

With the absorption liquor distributed among the towers in the following manner, it is found that six towers only are required to absorb 9.74 kilograms per hour of bromine (W=0.162 kg./minute).

| Tower No. | Liquor volume, cubic metres | Periodic time, minutes | Periodic time as a function of $\frac{W}{Q_L}$ |
|---|---|---|---|
| 1 | 4.00 | 14.4 | $24.7 \frac{W}{Q_L}$ |
| 2 | 2.00 | 7.2 | $12.3 \frac{W}{Q_L}$ |
| 3 | 1.50 | 5.4 | $9.3 \frac{W}{Q_L}$ |
| 4 | 1.00 | 3.6 | $6.2 \frac{W}{Q_L}$ |
| 5 | 1.00 | 3.6 | $6.2 \frac{W}{Q_L}$ |
| 6 | 0.50 | 1.8 | $3.1 \frac{W}{Q_L}$ |

The total liquor volume is 10 cubic metres.

Example 8

With the absorption liquor distributed among the towers in the following manner five towers only are required to absorb 9.72 kilograms per hour of bromine (W=0.162 kg./minute).

| Tower No. | Liquor volume, cubic metres | Periodic time, minutes | Periodic time as a function of $\frac{W}{Q_L}$ |
|---|---|---|---|
| 1 | 9.00 | 32.4 | $55.6 \frac{W}{Q_L}$ |
| 2 | 5.00 | 18.0 | $30.9 \frac{W}{Q_L}$ |
| 3 | 3.00 | 10.8 | $18.5 \frac{W}{Q_L}$ |
| 4 | 2.00 | 7.2 | $12.3 \frac{W}{Q_L}$ |
| 5 | 1.00 | 3.6 | $6.2 \frac{W}{Q_L}$ |

The total liquor volume is 20 cubic metres.

Example 9

With the absorption liquor distributed among the towers in the following manner it is found that five towers absorb 9.82 kilograms per hour of bromine (W=0.164 kg./minute).

| Tower No. | Liquor volume, cubic metres | Periodic time, minutes | Periodic time as a function of $\frac{W}{Q_L}$ |
|---|---|---|---|
| 1 | 12.0 | 43.2 | $73.2 \frac{W}{Q_L}$ |
| 2 | 10.00 | 36.0 | $61.0 \frac{W}{Q_L}$ |
| 3 | 8.00 | 28.8 | $48.8 \frac{W}{Q_L}$ |
| 4 | 6.00 | 21.6 | $36.6 \frac{W}{Q_L}$ |
| 5 | 4.00 | 14.4 | $24.4 \frac{W}{Q_L}$ |

The total liquor volume is 40 cubic metres.

The results of these examples are summarised in the following table, showing the number of towers required for various total absorption liquor volumes under various conditions.

| Example | Total absorption liquor volume | Number of towers required | Distribution | Remarks |
|---|---|---|---|---|
| | Cubic metres | | | |
| 1 | 5 | 9 | Even | Prior act process. |
| 2 | 10 | 7 | ...do | |
| 3 | 20 | 6 | ...do | |
| 4 | 40 | 5 | ...do | |
| | 80 | 4 | ...do | |
| 5 | 40 | 4 | ...do | Delay vessel of first tower heated to 60°C. |
| 6 | 5 | 8 | Uneven | |
| 7 | 10 | 6 | ...do | |
| 8 | 20 | 5 | ...do | |
| 9 | 40 | 5 | ...do | The total bromine absorption rate is greater than in Example 8. |

If there were an infinite volume of absorption liquor associated with each tower, three towers would be required to effect the necessary absorption. In such a case the labile bromine concentration is vanishingly small, and the partial pressure of bromine exerted by the solution may be taken as zero. Thus $$\frac{P_1 - P_2}{P_1} = E = 70\%$$

and hence, the partial pressure $P_2$ of bromine in the exit gas falls to 3.24 microatmospheres, i. e. less than 3 per cent of the initial value, when three towers are used.

The operation of the invention has thus been illustrated to show how a given rate of bromine absorption may be effected with a smaller number of absorption towers of a given efficiency than would normally be required. It is obvious that if the number of towers were fixed and their individual absorption coefficients fixed, a greater rate of absorption of bromine could be effected when working according to the present invention than when working according to the known process. In such a case, however, it would be more difficult to illustrate the operation of each individual tower.

As many apparently widely different embodiments of this invention may be made without departing from the spirit and scope thereof, it is to be understood that the invention is not limited to the specific embodiments thereof except as defined in the appended claims.

I claim:

1. In the recovery of bromine in fixed form, from gases containing bromine vapors, by methods wherein such gas is brought successively into contact with each of a plurality of bodies of alkaline reacting absorption liquor, circulated into and out of contact with said gas, for absorption of bromine from the said gas and partial fixation thereof in unstable combination in the liquor, whereby liquor having an appreciable bromine vapor pressure after contact with the gas is formed in at least one of said circulating bodies, the improvement which comprises maintaining such a total volume of liquor in at least the said one of said circulating bodies that the periodic time of circulation for that body of liquor is at least 5 $W/Q_L$ minutes, where $W$ is the total rate of absorption of bromine in all the said plurality of bodies of absorption liquor, in kilograms per minute, and $Q_L$ is the rate of circulation of the said one body of liquor, in cubic meters per minute, whereby the bromine absorbed by said body is largely converted into bromate and bromide, with lessening of the bromine vapor pressure, before the said liquor returns into contact with said gas.

2. The method of claim 1 wherein said circulating body of liquor having a periodic time of circulation of at least 5 $W/Q_L$ minutes, is subjected to heating, and to cooling, before it returns into contact with the bromine-containing gas, whereby said conversion is accelerated.

3. The method of claim 1 wherein the volume of said circulating body of liquor is such that the periodic time of circulation for that body is at least 10 $W/Q_L$ minutes.

4. The method of claim 1 wherein said body of liquor having a periodic time of circulation of at least 5 $W/Q_L$ minutes is the first body of liquor to come into contact with the bromine-containing gas.

ARTHUR TANDY WILLIAMSON.